United States Patent
Kennedy et al.

(10) Patent No.: US 11,315,565 B2
(45) Date of Patent: Apr. 26, 2022

(54) MULTI-PARTY CONVERSATIONAL AGENT

(71) Applicant: Disney Enterprises, Inc., Burbank, CA (US)

(72) Inventors: James R. Kennedy, Glendale, CA (US); Victor R. Martinez Palacios, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 288 days.

(21) Appl. No.: 16/840,240

(22) Filed: Apr. 3, 2020

(65) Prior Publication Data

US 2021/0312916 A1   Oct. 7, 2021

(51) Int. Cl.
*G10L 15/22* (2006.01)
*G06N 5/04* (2006.01)
*G06F 9/48* (2006.01)
*G06F 3/16* (2006.01)

(52) U.S. Cl.
CPC .............. *G10L 15/22* (2013.01); *G06F 3/167* (2013.01); *G06F 9/4812* (2013.01); *G06N 5/04* (2013.01); *G10L 2015/223* (2013.01)

(58) Field of Classification Search
CPC ... G10L 13/00; G10L 13/02; G10L 2015/223; G10L 15/22; G06N 5/04; G06F 9/4812; G06F 3/1454; G06F 3/165; G06F 3/167; G06F 21/31; G06F 3/011; G06F 3/013; G06F 3/0482; G06F 3/0484; G06F 3/04883; G06F 3/04886; G06F 3/1423; G09G 2370/16
USPC ...................... 704/275, 231, 251, 270, 270.1
See application file for complete search history.

(56) References Cited

U.S. PATENT DOCUMENTS

| | | | | |
|---|---|---|---|---|
| 10,592,095 | B2 * | 3/2020 | Kasemset | G10L 13/00 |
| 11,222,325 | B2 * | 1/2022 | Van Os | G06Q 20/322 |
| 2004/0172255 | A1 * | 9/2004 | Aoki | H04M 3/566 |
| | | | | 704/275 |
| 2010/0162138 | A1 * | 6/2010 | Pascal | G06Q 10/107 |
| | | | | 715/758 |
| 2013/0024786 | A1 * | 1/2013 | Dayal | G06Q 10/10 |
| | | | | 715/753 |

(Continued)

OTHER PUBLICATIONS

IrisTK: a Statechart-based Toolkit for Multi-party Face-to-face Interaction by Gabriel Skantze and Samer Al Moubayed. Oct. 22, 2012. p. 1-8.

(Continued)

*Primary Examiner* — Vijay B Chawan
(74) *Attorney, Agent, or Firm* — Farjami & Farjami LLP

(57) ABSTRACT

A multi-party conversational agent includes a computing platform having a hardware processor and a memory storing a software code. The hardware processor is configured to execute the software code to identify a first predetermined expression for conversing with a group of people, and to have a group conversation, using the first predetermined expression, with at least some members of the group. The hardware processor is configured to further execute the software code to identify, while having the group conversation, a second predetermined expression for having a dialogue with at least one member of the group, and to interrupt the group conversation to have the dialogue, using the second predetermined expression, with the at least one member of the group.

20 Claims, 9 Drawing Sheets

(56) References Cited

U.S. PATENT DOCUMENTS

| | | | |
|---|---|---|---|
| 2013/0188032 A1* | 7/2013 | Vertegaal | H04N 7/18 |
| | | | 348/78 |
| 2016/0021039 A1* | 1/2016 | Woo | H04L 51/046 |
| | | | 715/752 |
| 2016/0055325 A1* | 2/2016 | Ozzie | H04L 65/00 |
| | | | 726/3 |
| 2016/0379118 A1* | 12/2016 | Ito | G06Q 10/101 |
| | | | 706/46 |
| 2017/0235465 A1* | 8/2017 | Marin | G06F 3/167 |
| | | | 715/716 |
| 2017/0351402 A1* | 12/2017 | Yoakum | H04L 12/1822 |
| 2017/0351476 A1* | 12/2017 | Yoakum | G06F 3/0484 |
| 2017/0353694 A1* | 12/2017 | Yoakum | G06F 3/165 |
| 2018/0293221 A1* | 10/2018 | Finkelstein | G06N 20/00 |
| 2018/0350360 A1* | 12/2018 | Knudson | G10L 25/51 |
| 2018/0367495 A1* | 12/2018 | Kim | H04L 51/046 |

OTHER PUBLICATIONS

Probabilistic Multiparty Dialogue Management for a Game Master Robot by Casey Kennington, Kotaro Funakoshi, and Yuki Takahashi. Mar. 3, 2014. p. 1-2.

* cited by examiner

MULTI-PARTY CONVERSATIONAL AGENT

BACKGROUND

Advances in artificial intelligence have led to the development of a variety of devices providing one of several dialogue-based interfaces, such as GOOGLE HOME™, AMAZON ALEXA™, and others. However, one shortcoming of all such existing systems is their inability to engage in natural, fluid conversations with more than one person at a time. Moreover, although existing conversational agents offer some degree of user personalization, for example tailoring responses to an individual user's characteristics or preferences, that personalization remains limited by the transactional design of conventional conversational agents. That is to say, their transactional functionality makes it unnecessary for conventional conversational agents to remember more than a few past interactions and a limited set of predefined keywords, such as user names and basic user preferences. Thus, there is a need in the art for a conversational agent capable of interacting with multiple users concurrently in an emotionally sophisticated and engaging manner.

SUMMARY

There are provided multi-party conversational agents and methods for their use, substantially as shown in and/or described in connection with at least one of the figures, and as set forth more completely in the claims.

DETAILED DESCRIPTION

Figure 1:
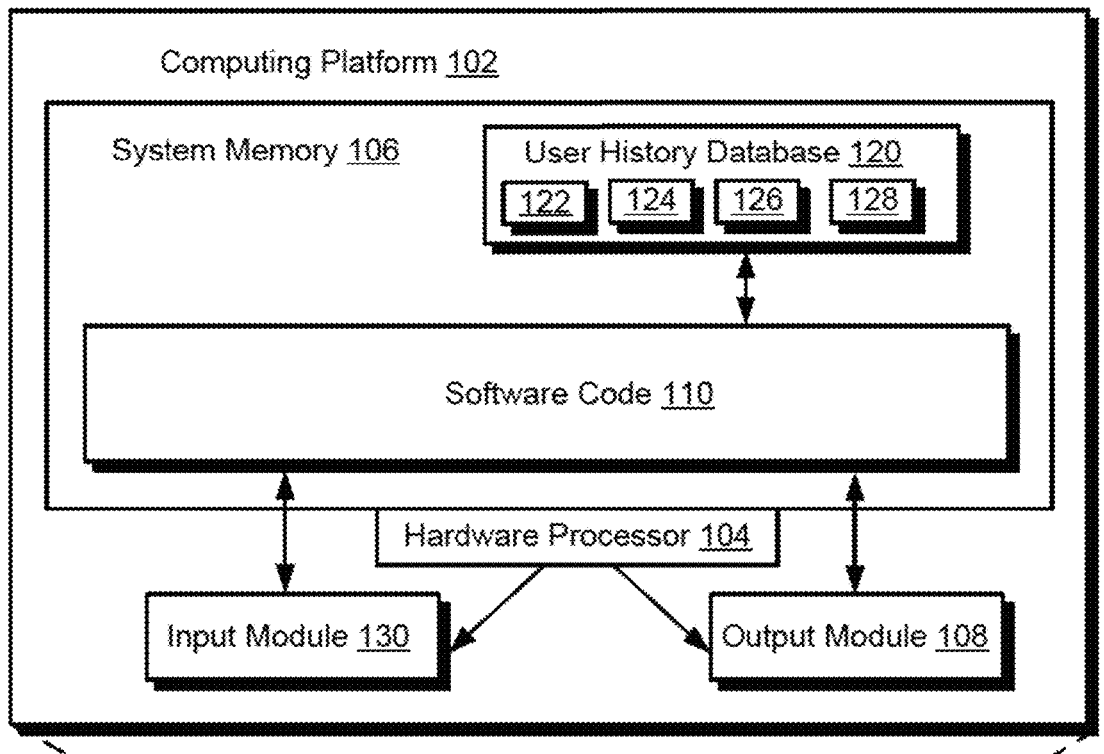
FIG. 1 shows an exemplary multi-party conversational agent, according to one implementation.
Figure 1:
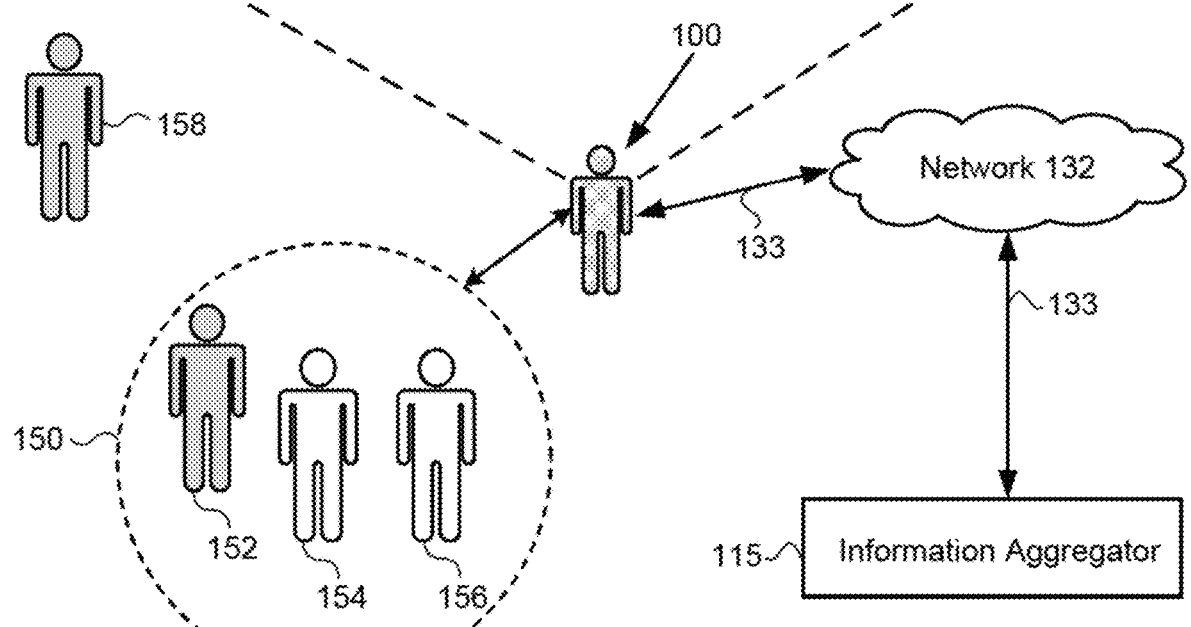

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses automated multi-party conversational agents and methods for their use that address and overcome the deficiencies in the conventional art. It is noted that, as used in the present application, the terms "automation," "automated", and "automating" refer to systems and processes that do not require the participation of a human administrator. Although, the conversation topics and the predetermined expressions used by the multi-party conversational agent disclosed herein are programmed into software code by a human author, the selection and use of those resources to initiate and continue a multi-party conversation or dyadic dialogue is performed in an automated process. Thus, the methods described in the present application may be performed under the control of hardware processing components of the disclosed multi-party conversational agents.

It is further noted that, as used in the present application, the term "conversational agent" refers to a non-human communicative entity rendered in hardware and software that is designed for expressive interaction with one or more human users. In some use cases, a conversational agent may be instantiated as a virtual character rendered on a display and appearing to watch and listen to a user in order to have a conversation with the user. In other use cases, a conversational agent may take the form of a machine, such as a robot for example, appearing to watch and listen to a user in order to converse with the user. Alternatively, a conversational agent may be implemented as an automated voice response (AVR) system, or an interactive voice response (IVR) system, for example.

FIG. 1 shows an exemplary multi-party conversational agent, according to one implementation. As shown in FIG. 1, multi-party conversational agent 100 includes computing platform 102 having hardware processor 104, input module 130, output module 108, and system memory 106 implemented as a non-transitory storage device. According to the present exemplary implementation, system memory 106 stores software code 110 and user history database 120 including user histories 122, 124, 126, and 128.

As further shown in FIG. 1, multi-party conversational agent 100 is implemented within a use environment including at least group 150 having group members 152, 154, and 156 (also hereinafter "users 152, 154, and 156"), as well as user 158 who may not presently be a member of group 150. Moreover, and as also shown in FIG. 1, in some implementations, multi-party conversational agent 100 may be communicatively coupled to one or more information aggregators 115 (hereinafter "information aggregator(s) 115") via communication network 132 and network communication links 133.

Information aggregator(s) 115 may correspond to one or more databases and/or one or more knowledge bases, for example, from which multi-party conversational agent 100 can obtain information relevant to a conversation with group 150. For example, multi-party conversational agent 100 may obtain current weather, sports, or news information from information aggregator(s) 115 for use in conversing with group 150. As noted above, information aggregator(s) 115 may be accessible to multi-party conversational agent 100 via communication network 132 and network communication links 133. Communication network 132 may be a packet-switched network such as the Internet, for example. Alternatively, communication network 132 may take the form of a wide area network (WAN), a local area network (LAN), or another type of limited distribution or private network.

It is noted that, although the present application refers to software code 110 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Figure 2A:
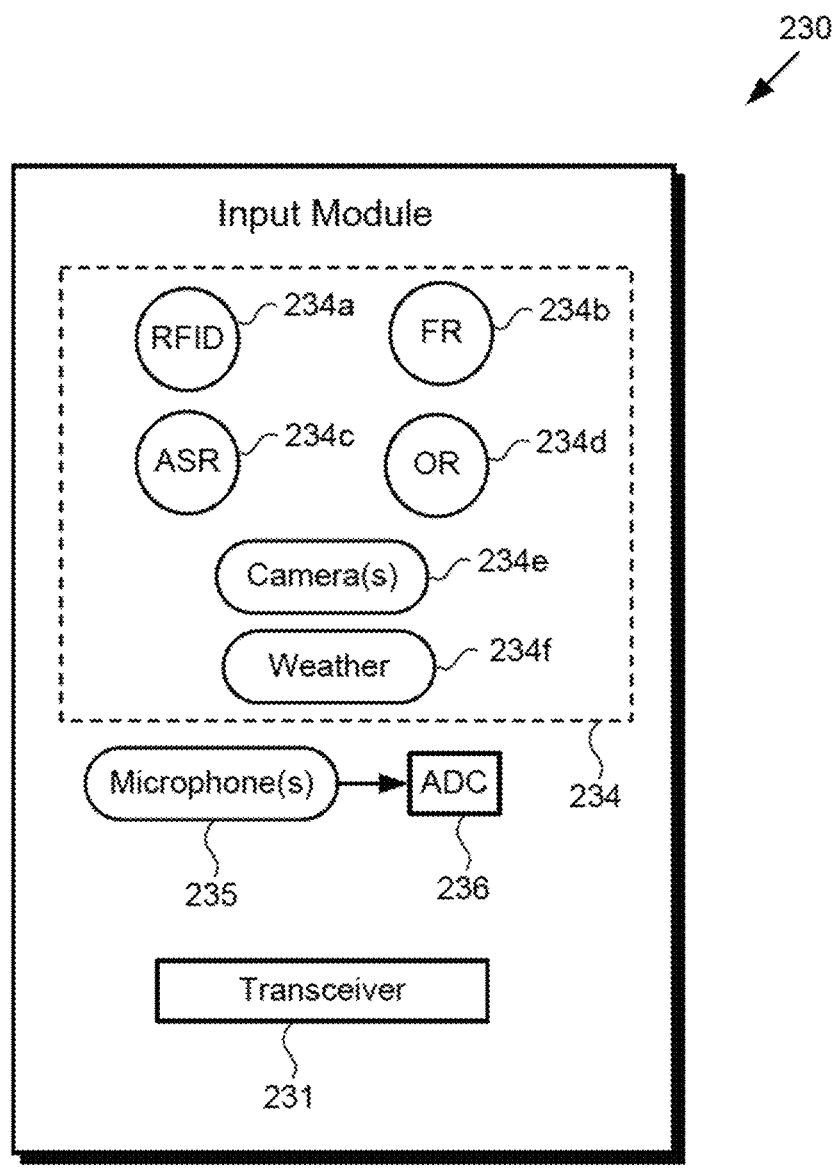
FIG. 2A shows a more detailed diagram of an input module suitable for use in a multi-party conversational agent, according to one implementation

FIG. 2A shows a more detailed diagram of input module 230 suitable for use in multi-party conversational agent 100, in FIG. 1, according to one implementation. As shown in FIG. 2A, input module 230 includes multiple sensors 234, one or more microphones 235 (hereinafter "microphone(s) 235"), analog-to-digital converter (ADC) 236, and may include transceiver 231. As further shown in FIG. 2A, sensors 234 of input module 230 may include radio-frequency identification (RFID) sensor 234a, facial recognition (FR) sensor 234b, automatic speech recognition (ASR) sensor 234c, object recognition (OR) sensor 234d, one or more cameras 234e (hereinafter "camera(s) 234e"), and one or more weather sensor(s) 234f (hereinafter "weather sensor(s) 234f"). Input module 230 corresponds in general to input module 130, in FIG. 1. Thus, input module 130 may share any of the characteristics attributed to input module 230 by the present disclosure, and vice versa.

It is noted that the specific sensors shown to be included among sensors 234 of input module 130/230 are merely exemplary, and in other implementations, sensors 234 of input module 130/230 may include more, or fewer, sensors than RFID sensor 234a, FR sensor 234b, ASR sensor 234c, OR sensor 234d, camera(s) 234e, and weather sensor(s) 234f. Moreover, in other implementations, sensors 234 may include a sensor or sensors other than one or more of RFID sensor 234a, FR sensor 234b, ASR sensor 234c, OR sensor 234d, camera(s) 234e, and weather sensor(s) 234f. It is further noted that camera(s) 234e may include various types of cameras, such as red-green-blue (RGB) still image and video cameras, RGB-D cameras including a depth sensor, and infrared (IR) cameras, for example. It is also noted that weather sensor(s) 234f may include temperature sensors, humidity and/or precipitation sensors, and barometric pressure sensors, to name a few examples.

When included as a component of input module 130/230, transceiver 231 may be implemented as a wireless communication unit enabling multi-party conversational agent 100 to obtain data from information aggregator(s) 115 via communication network 132 and network communication links 133. For example, transceiver 231 may be implemented as a fourth generation (4G) wireless transceiver, or as a 5G wireless transceiver configured to satisfy the IMT-2020 requirements established by the International Telecommunication Union (ITU).

Figure 2B:
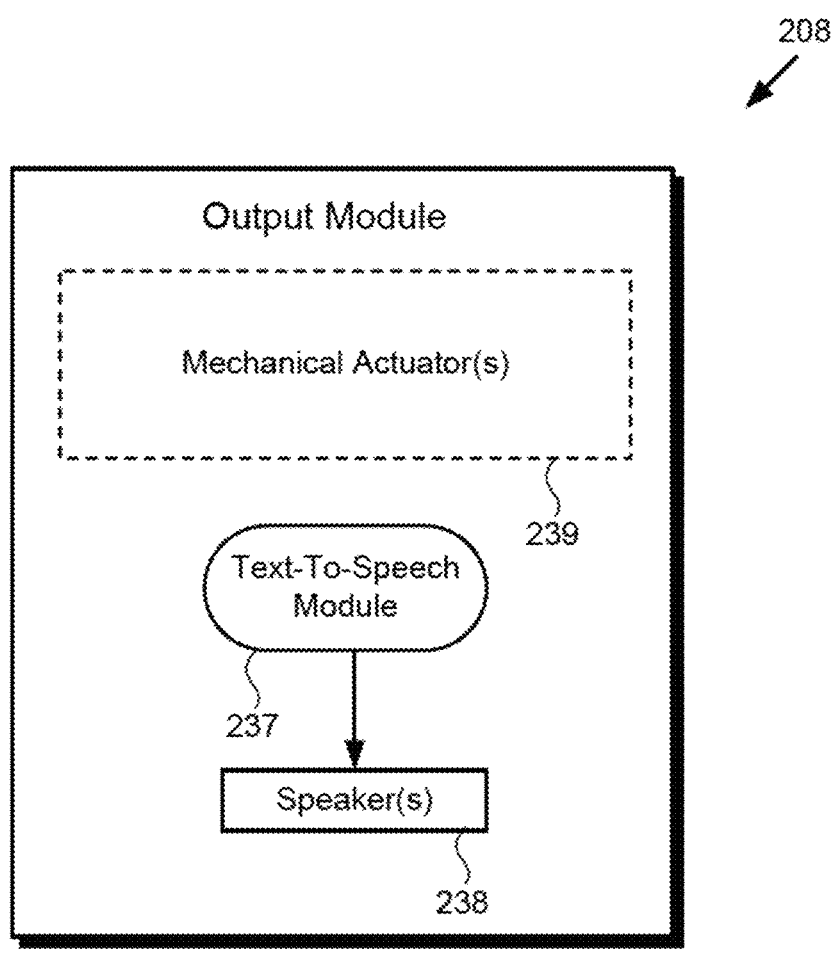
FIG. 2B shows a more detailed diagram of an output module suitable for use in a multi-party conversational agent, according to one implementation

FIG. 2B shows a more detailed diagram of output module 208 suitable for use in multi-party conversational agent 100, in FIG. 1, according to one implementation. As shown in FIG. 2B, output module 208 includes at least Text-To-Speech (TTS) module 237 and one or more audio speakers 238 (hereinafter "audio speaker(s) 238"). As further shown in FIG. 2B, in some implementations, output module 208 may include one or more mechanical actuators 239 (hereinafter "mechanical actuator(s) 239"). It is noted that, when included as a component or components of output module 208, mechanical actuator(s) 239 may be used to produce facial expressions by multi-party conversational agent 100, and/or to articulate one or more limbs or joints of multi-party conversational agent 100. Output module 208 corresponds in general to output module 108, in FIG. 1. Thus, output module 108 may share any of the characteristics attributed to input module 208 by the present disclosure, and vice versa.

It is noted that the specific components shown to be included in output module 108/208 are merely exemplary, and in other implementations, output module 108/208 may include more, or fewer, components than TTS module 237, speaker(s) 238, and mechanical actuator(s) 239. Moreover, in other implementations, output module 108/208 may include a component or components other than one or more of TTS module 237, speaker(s) 238, and mechanical actuator(s) 239.

Figure 3:
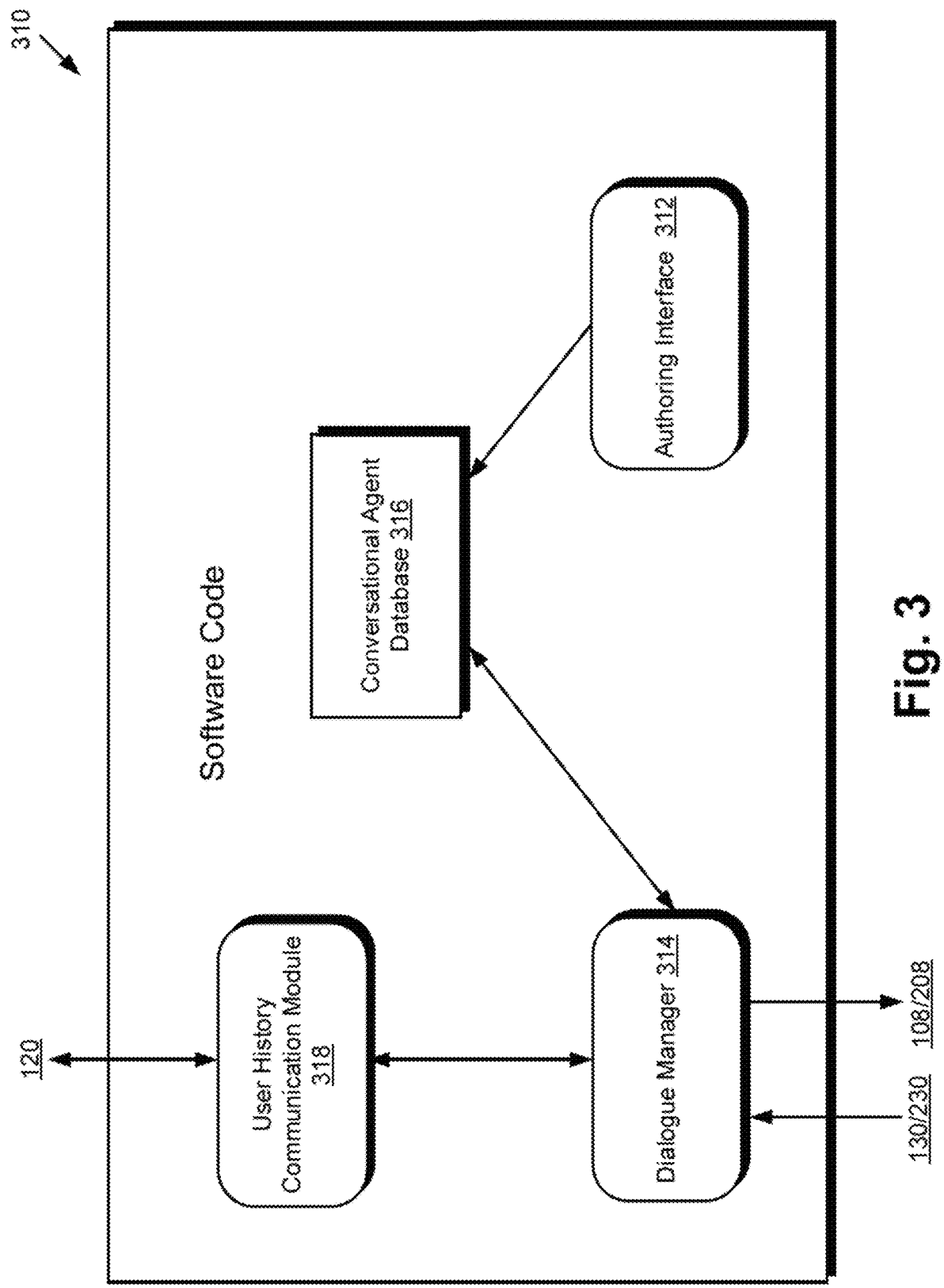
FIG. 3 shows an exemplary software code suitable for execution by a hardware processor of the multi-party conversational agent of FIG. 1, according to one implementation.

FIG. 3 shows exemplary software code 310 suitable for execution by hardware processor 104 of multi-party conversational agent 100, in FIG. 1, according to one implementation. As shown in FIG. 3, software code 310 may include authoring interface 312, dialogue manager 314, conversational agent database 316, and user history communication module 318. As shown in FIG. 3, user history communication module 318 is configured to be communicatively coupled to user history database 120, in FIG. 1, while dialogue manager 314 is configured to be communicatively coupled to input module 130/230 and output module 108/208. As further shown in FIG. 3, authoring interface 312 of software code 310 is interactively linked to conversational agent database 313, and dialogue manager 314 is interactively linked to user history communication module 318, as well as to conversational agent database 316.

Software code 310, in FIG. 3, corresponds in general to software code 110, in FIG. 1, and those corresponding features may share any of the characteristics attributed to either corresponding feature by the present disclosure. That is to say, like software code 310, software code 110 may include features corresponding respectively to authoring interface 312, dialogue manager 314, conversational agent database 316, and user history communication module 318.

Figure 4A:
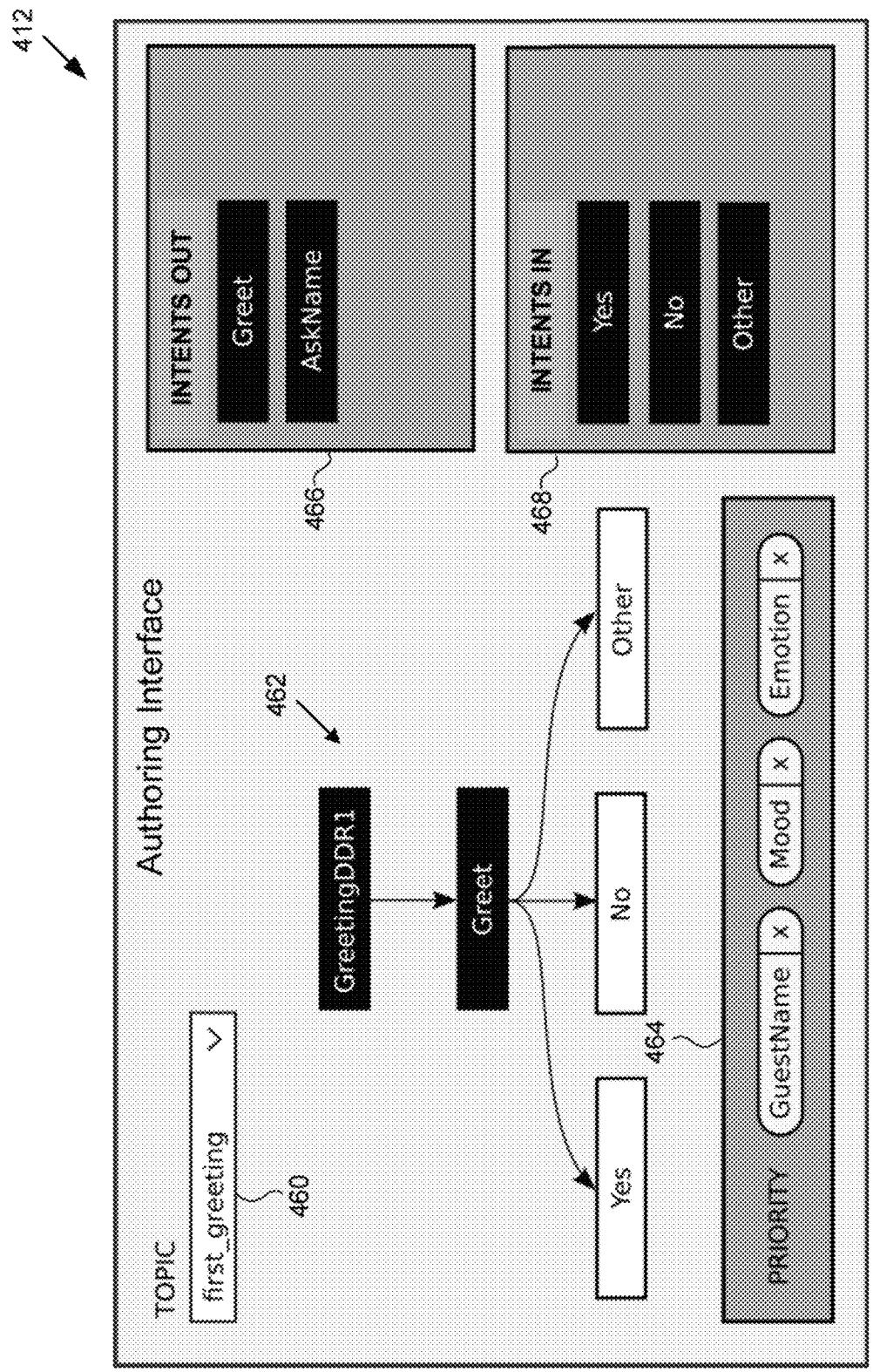
FIG. 4A shows an exemplary authoring interface provided by the software code of FIG. 3, displaying a dialogue graph for use by a multi-party conversational agent, according to one implementation.

FIG. 4A shows exemplary authoring interface 412 provided by software code 110/310, according to one implementation. As shown in FIG. 4A, authoring interface 412 enables an author or a programmer of multi-party conversational agent 100 to select topic 460 of a conversation presently being authored, as well as to identify what are deemed important variables of the conversation using priority panel 464. Also shown in FIG. 4A is dialogue tree or dialog graph 462 linking the objectives of the conversation being authored, i.e., "intents out" 466 with expected answers, i.e., "intents in" 468 from one or more members of group 150 engaged in conversation with multi-party conversational agent 100.

It is noted that multi-party conversational agent 100 extends the traditional concept of dialogue trees to allow an author or a programmer of multi-party conversational agent 100 to create loops, thereby producing directed graphs. As a result, the feature "dialog tree" will hereinafter be referred to more generally as "dialog graph." It is further noted that, as used in the present application, the terms "intent" or "intents" may refer to verbal expressions or non-verbal behaviors by multi-party conversational agent 100, as well the members of group 150. Referring to FIG. 2A, intents on the part of the members of group 150 in the form of verbal expressions may be identified by performing natural language understanding (NLU) on speech sensed by ASR sensor 234c. Intents on the part of the members of group 150 in the form of non-verbal behaviors may be identified by multi-party conversational agent 100 through use of camera(s) 234e and/or FR sensor 234b. It is also noted that authoring interface 412 corresponds in general to authoring interface 312, in FIG. 3, and those corresponding features may share any of the characteristics attributed to either corresponding feature by the present disclosure.

Figure 4B:
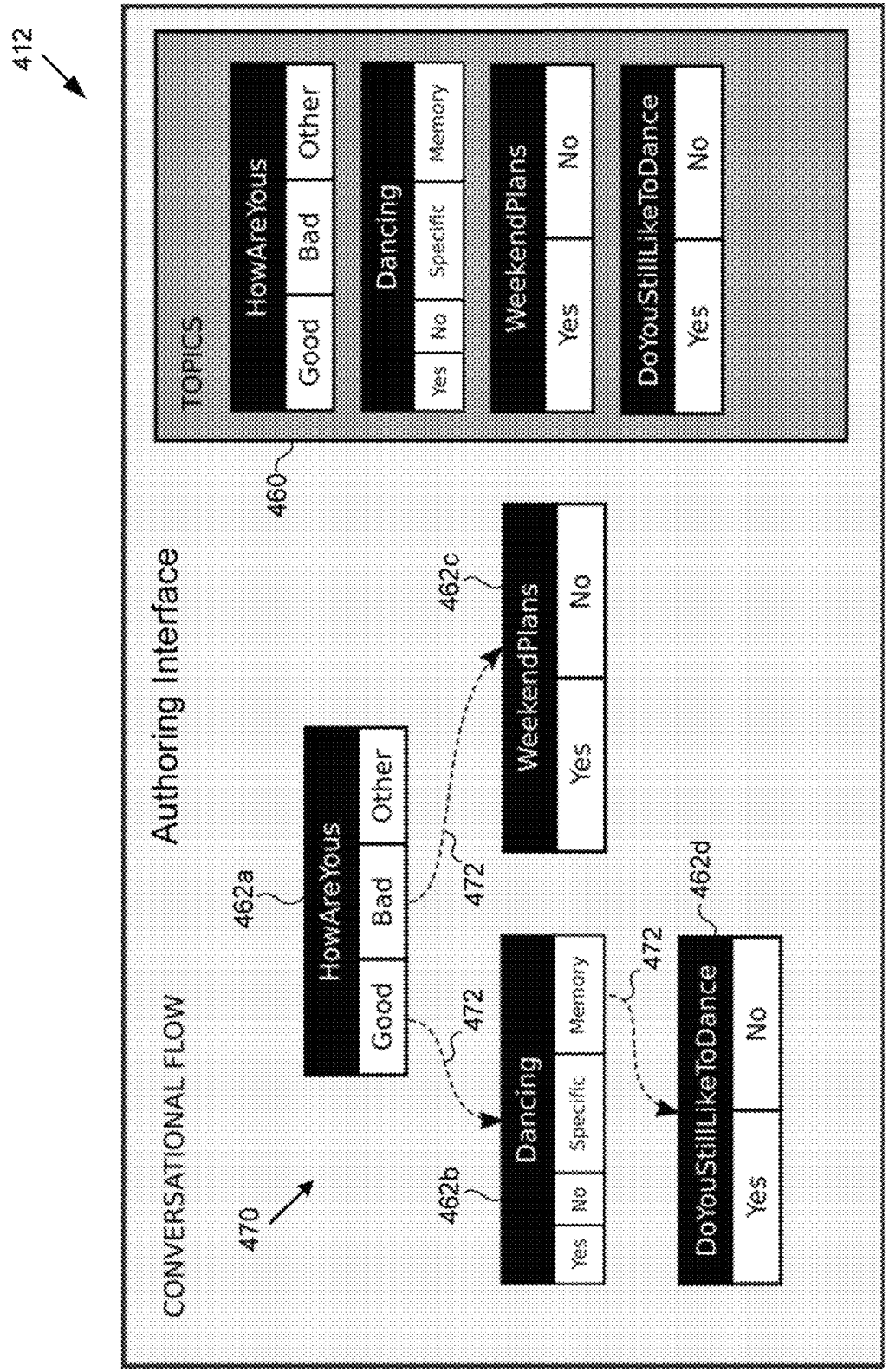
FIG. 4B shows the exemplary authoring interface of FIG. 4A, displaying a conversational flow for a multi-party conversational agent, according to one implementation.

FIG. 4B shows exemplary authoring interface 412 displaying conversational flow 470 for multi-party conversational agent 100, according to one implementation. It is noted that any features in FIG. 4B identified by reference numbers identical to those shown in FIG. 4A correspond respectively to those previously described features and may share any of the characteristics attributed to them above. FIG. 4B shows list of topics 460, each topic corresponding to one or more previously authored dialogue graphs, represented in FIG. 4A by exemplary dialogue graphs 462a, 462b, 462c, and 462d (hereinafter "dialogue graphs 462a-462d"). Conversational flow 470 can be created by an author or a programmer of multi-party conversational agent 100 by linking terminal nodes of a particular dialogue to the root of another using flow-edges 472. For example, a conversation beginning with dialogue graph 462a continues to dialogue graph 462c if dialogue graph 462a terminates at the response "bad" from one or more members of group 150. By contrast, that conversation continues to dialogue graph 462b, and may continue further to dialogue graph 462d when dialogue graph 462a terminates at the response "good."

Authoring interface 312/412 gives an author or a programmer of multi-party conversational agent 100 an interactive user interface where they can design conversational flow 470 from dialogue graphs 462a-462d. Conversational flow 470 describes the way a conversational topic is advanced to achieve each one of its goals (e.g., Greeting, HowAreYous, etc.) As shown in FIG. 4A, each goal corresponds to a dialogue graph, e.g., dialogue graph 462, spanning multiple nodes. Each node represents one intent, and it could be either (a) an intent from one or more members of group 150 (e.g., AnswerYes, AnswerNo), (b) an internal state (e.g., UserAnsweredYes, UserAnsweredNo), or (c) an intent from one or more members of group 150 that is remembered by multi-party conversational agent 100 from a previous interaction.

Referring to FIG. 1, FIG. 3, and FIG. 4B in combination, an example of a remembered intent is shown by the transition from dialogue graph 462b to dialogue graph 462d. In that use case, initiating dialogue graph 462b for topic 460 labeled "dancing" results in dialogue manager 314 utilizing user history communication module 318 to obtain a user history for one or more members of group 150 and thereby "remember" that the group member or members have previously informed multi-party conversational agent 100 that dancing is liked. The presence of that previously obtained information in memory, i.e., in user database 120 stored in system memory 106, allows multi-party conversational agent 100 to transition seamlessly to dialogue graph 462d, rather than asking the default predetermined question for initiating dialogue graph 462b, i.e., "Do you like to dance?"

In order to create a new conversational flow corresponding to conversational flow 470, an author or a programmer of multi-party conversational agent 100 can use authoring interface 312/412 to drag-and-drop dialogue graphs corresponding to topics 460, and then connect them using flow-edges 472. Additionally, as shown by FIG. 4A, an author or a programmer can define variables that dictate what is of importance at each stage of the conversation. These variables can be selected to prioritize mood and emotion, for example, as well as any additional memory variables that multi-party conversational agent 100 has access to (e.g., time of day, group member's name). As shown in FIG. 4B, conversational flow 470 is guided using flow-edges 472 described above. Together the authoring features described above provide a simple and effective way of designing conversations that can interact with groups of people over a variety of topics. Moreover, authoring interface 312/412 enables the explicit distinction between dyadic dialogues between multi-party conversational agent 100 and a single member of group 150 (e.g., greetings), and group conversations with some or all members of group 150. This difference is important in a multi-party setting as it enables multi-party conversational agent 100 to dynamically switch between addressing group 150 and one of its members 152, 154, or 156, making for a more naturalistic conversation.

Figure 5A:
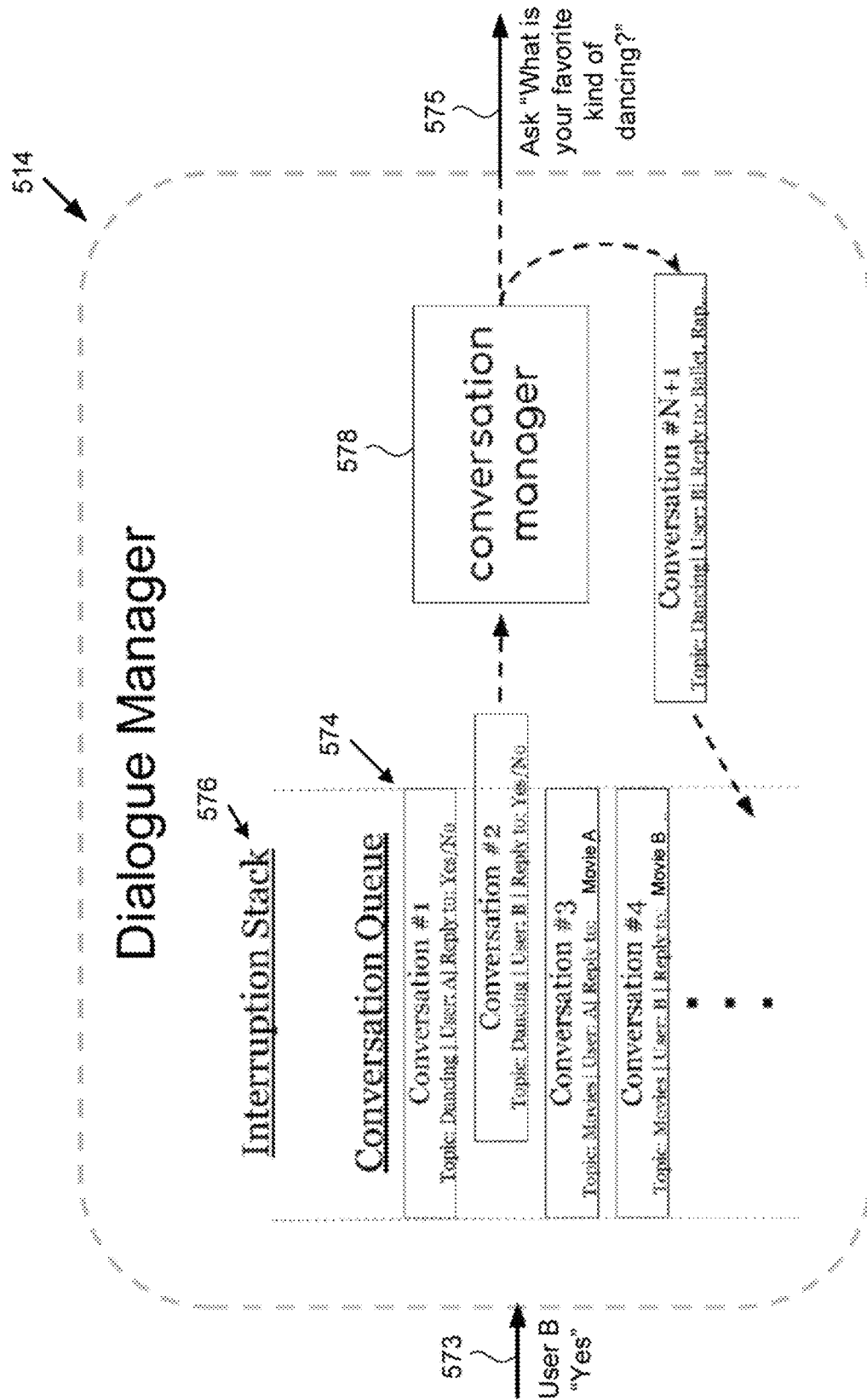
FIG. 5A shows an exemplary diagram of a dialogue manager included in the software code of FIG. 3 utilizing a conversation queue to coordinate a multi-party conversation, according to one implementation.

FIG. 5A shows an exemplary diagram of dialogue manager 314 included in software code 110/310 utilizing a conversation queue to coordinate a multi-party conversation, according to one implementation. As shown in FIG. 5A, dialogue manager 514 includes conversation queue 574 being utilized by conversation manager 578, as well as interrupt stack 576, which is presently not in use. As noted above, dialogue manager 514 corresponds in general to dialogue manager 314, in FIG. 3. Thus, dialogue manager 314 may share any of the characteristics attributed to dialogue manager 514 by the present disclosure, and vice versa.

Figure 5B:
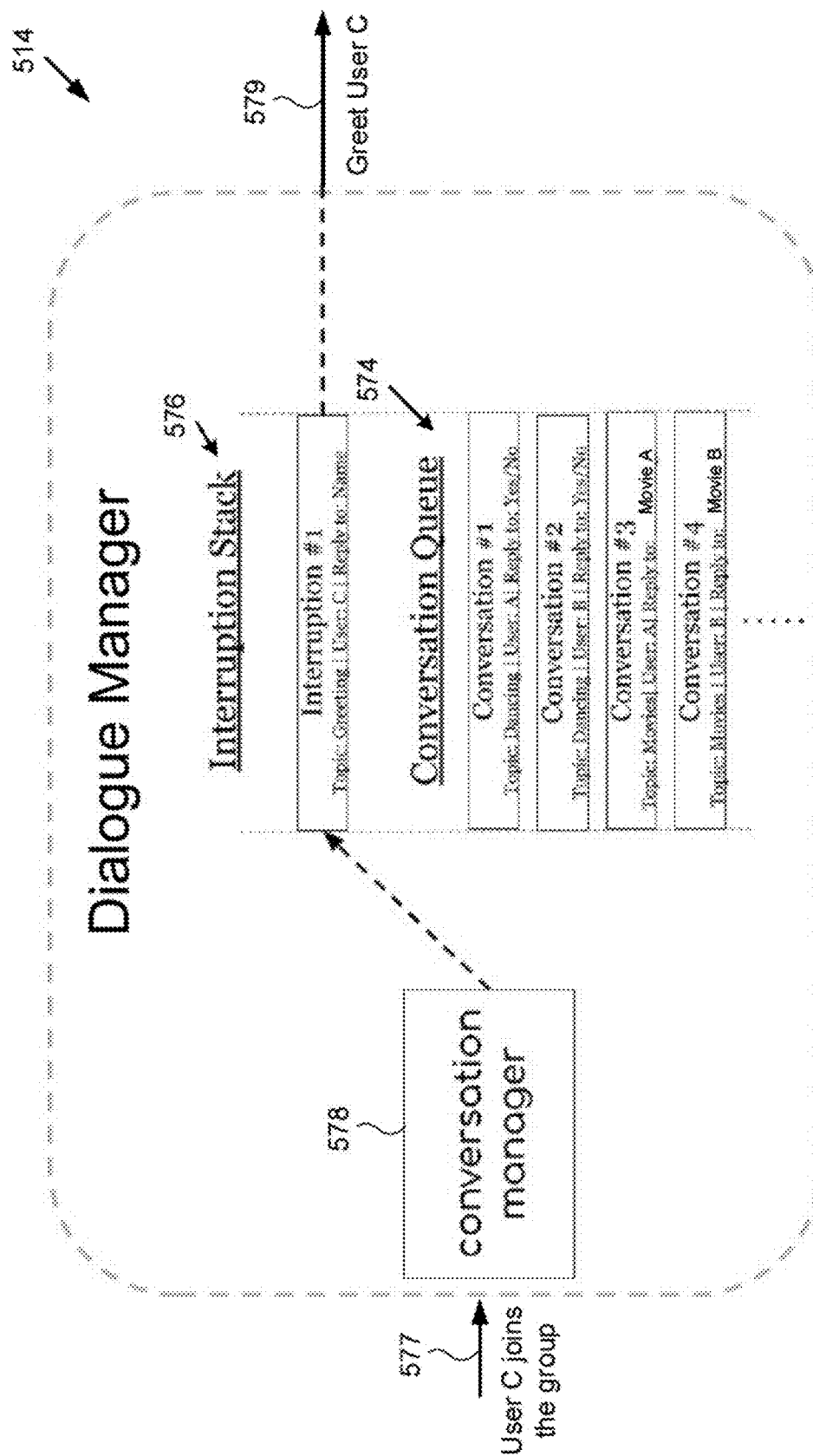
FIG. 5B shows the exemplary dialogue manager of FIG. 5A utilizing an interruption stack to coordinate a multi-party conversation, according to one implementation.

The exemplary implementation shown in FIG. 5A depicts a use case in which multi-party conversational agent 100 converses with a group having two members identified for the purposes of FIG. 5A and subsequent FIG. 5B as "User A" and "User B." Referring to FIG. 1, it is noted that User A corresponds to any one of members 152, 154, or 156 of group 150, while User B corresponds to any other member of group 150.

According to the exemplary use case shown in FIG. 5A, conversation manager 578 utilizes conversation queue 574 to continue a User B thread of a group conversation in which both of User A and User B are participants. Moreover, the User B thread processed by dialogue manager 514 in FIG. 5A is a thread from one of two group conversations being conducted concurrently. That is to say, User A conversation thread #1 and User B conversation thread #2 are part of a group conversation directed to the topic "dancing", while User A conversation thread #3 and User B conversation thread #4 are part of a group conversation directed to the topic "movies." As shown in FIG. 5A, User B replies to a prompt from multi-party conversational agent 100 with the answer "yes" 573 that corresponds to what was expected in conversation thread #2. As a result, conversation manager 578 forwards new intent 575 and queues new conversation thread #N+1 for User B.

FIG. 5B shows exemplary dialogue manager of 514 utilizing interruption stack 576 to coordinate a multi-party conversation, according to one implementation. It is noted that any features in FIG. 5B identified by reference numbers identical to those shown in FIG. 5A correspond respectively to those previously described features and may share any of the characteristics attributed to them above. FIG. 5B depicts the processing of non-verbal intent 577, i.e., new User C joining the group originally including only User A and User B. As shown in FIG. 5B conversation manager 578 creates interruption #1 and adds it to interruption stack 576, which causes dialogue manager 514 to initiate Greet User procedure 579.

In other words, according to the exemplary use case depicted in FIG. 5B, during a group conversation that multi-party conversational agent 100 is having with group 150 including only User A and User B, multi-party conversational agent 100 senses a change in the composition of group 150. In response, multi-party conversational agent 100 identifies a predetermined expression based on the sensed change in the composition of group 150, and interrupts the group conversation to have a dyadic dialogue with the new member of group 150, i.e., User C.

Conversation manager 578 oversees driving the interaction of multi-party conversational agent 100 with group 150. Dialogue manager 514 can use conversation manager 578 to keep track of who the audience, i.e., speaker and addressee, and the current conversation threads (markers on who has said what and their expected responses). In addition, dialogue manager 514 can use conversation manager to respond in a consistent manner to multi-party interaction dynamics that typically overwhelm conventional solutions. For example, dialogue manager 514 can use conversation manager 578 to maintain continuity and relevance of conversational threads as one or group members depart during a group conversation, despite addition of one or more new members to a group, or in the presence of verbal interruptions or interruptions in the form of gestures by group members.

The advantages of the present multi-party conversational agent solution are achieved as the result of a two-step approach. First, as noted above, non-verbal behaviors are included as additional user intents. That inclusion of non-verbal behaviors as user intents advantageously enables mapping of user behaviors to updates to the internal state of multi-party conversational agent 100. Second, conversational flow is modeled within two structures: (1) a queue of conversation threads, and (2) a stack of interruptions. The conversation queue includes a priority queue that holds conversation objects (representing each one of the active conversation threads) indexed by expected response intents. Conversation objects maintain a record of expected response intents, origin intent, topic, and addressee. During an interaction, a user's intents are checked against the queue and if a result is found, i.e., a reply to previous topic is received, that conversation object is used as the pivoting point for carrying on with the group conversation.

The interruption stack holds records of the current interruptions. Dialogue manager 514 uses conversation manager 578 to process interruptions in a last-in first-out manner until no interruptions remain. The two-step approach described above provides the tools to construct a more natural multi-party group conversation. For example, and as described above, multi-party conversational agent 100 can have a group conversation with a group of users, can interrupt itself when a new person arrives, can greet and ask the name of the new person in a dyadic dialogue with the new person only, and can resume the group conversation by rephrasing or summarizing what was being said before the interruption.

Figure 6:
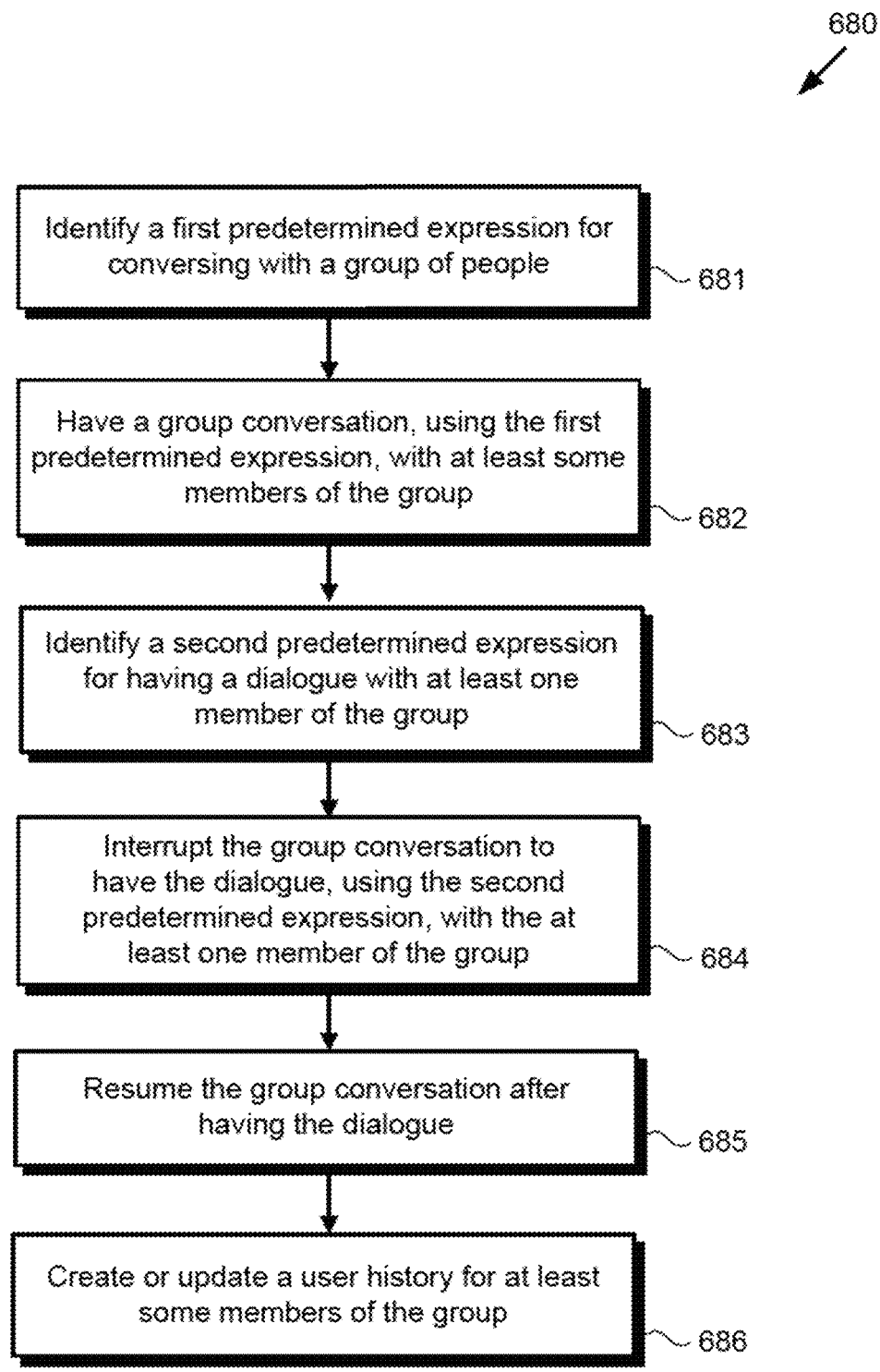
FIG. 6 shows a flowchart presenting an exemplary method for use by a multi-party conversational agent, according to one implementation.

The functionality of software code 110/310 will be further described by reference to FIG. 6. FIG. 6 shows flowchart 680 presenting an exemplary method for use by multi-party conversational agent 100, according to one implementation. With respect to the method outlined in FIG. 6, it is noted that certain details and features have been left out of flowchart 680 in order not to obscure the discussion of the inventive features in the present application.

Referring to FIG. 6, with further reference to FIGS. 1 and 2, flowchart 680 begins with identifying a first predetermined expression for conversing with a group of people, i.e., group 150 in FIG. 1 (action 681). The first predetermined expression for conversing with group 150 may be identified by software code 110/310, executed by hardware processor 104 of multi-party conversational agent 100, based on data received from input module 130/230 and using dialogue manager 314/514, as well as one or more of conversation agent database 316 and user history communication module 318.

For example, input module 130/230 may detect the presence of group 150 based on audio inputs received from group 150 by microphone(s) 235 and/or image capture and interpretation performed using one or more of sensor(s) 234. Data received by software code 110/310 from input module 130/230 may be processed to identify the first predetermined expression for conversing with group 150. In one implementation, dialogue manager 314/514 may utilize user history communication module 318 to communicate with user history database 120 to determine if one or more users included in group 150 is remembered by multi-party conversational agent 100.

As noted above by reference to FIG. 1, FIG. 3, and FIG. 4B in combination, an example of a remembered intent is shown by the transition from dialogue graph 462b to dialogue graph 462d. In that use case, initiating dialogue graph 462b for topic 460 labeled "dancing" results in dialogue manager 314/514 utilizing user history communication module 318 to obtain a user history for one or more users included in group 150 and thereby "remember" that the user or users have previously informed multi-party conversational agent 100 that dancing is liked. The presence of that previously obtained information in memory, i.e., in user database 120 stored in system memory 106, allows multi-party conversational agent 100 to transition seamlessly to dialogue graph 462d, rather than asking the default predetermined question for initiating dialogue graph 462b, i.e., "Do you like to dance?"

Although the remembered intent example discussed above applies to transitions among dialogue graphs 462 included in conversational flow 470, such reliance on memory can also be used to select an appropriate root for initiating conversational flow 470 with group 150 dynamically based on a user history for one or more users included in group 150. That is to say, in some implementations, the first predetermined expression for conversing with group 150 may be identified in action 681 based on a user history of at least one member of group 150.

Regarding user history database 120, according to the present novel and inventive principles every user-intent may be assigned a memory-intent counterpart that collects the answers to queries received from a particular user during one or more previous interactions, such as group conversations including the user, or dyadic dialogues between the user and multi-party conversational agent 100. When a conversation includes a memory-intent, dialogue manager 314/514 can check what is remembered for the user by utilizing user history communication module 318 to obtain user history data stored in user history database 120. If relevant user history data is obtainable, dialogue manager 314/514 may automatically traverse the dialogue graphs included in a particular predetermined conversational flow authored using authoring interface 312/412 to fill in conversation fields for which memory data has been obtained. If there is no memory data available for any member of group 150, the conversational flow continues along its authored path. This approach advantageously results in conversations that engage with users in a personalized manner over multiple interactions.

It is noted that the data describing previous interactions and retained in user history database 120 is exclusive of personally identifiable information (PII) of users with whom multi-party conversational agent 100 has interacted. Thus, although multi-party conversational agent 100 is typically able to distinguish an anonymous user with whom a previous conversation or dyadic dialogue has occurred from anonymous users having no previous interaction experience with multi-party conversational agent 100, user history database does not retain information describing the age, gender, race, ethnicity, or any other PII of any user with whom multi-party conversational agent 100 converses or otherwise interacts.

Flowchart 680 continues with having a group conversation, using the first predetermined expression identified in action 681, with at least some members of group 150 (action 682). In some use cases, as noted above, multi-party conversational agent 100 may not recognize any of users 152, 154, or 156 included in group 150 as a remembered user. In those cases, dialogue manager 314/514 may identify the first predetermined expression in action 681 as the root of a conversational flow specifically authored as a greeting to a group of new users. Thus, in some implementations, action 682 may include having a group conversation with all of the users included in group 150.

In other use cases, as discussed above, multi-party conversational agent 100 may recognize some of users 152, 154, or 156 included in group 150 as remembered users, but not others. For example, multi-party conversational agent 100 may remember previous interactions with users 152 and 154, but none with user 156. In that case, dialogue manager 314/514 may identify the first predetermined expression in action 681 as the root of a conversational flow having conversation fields dynamically filled with data obtained from a user history of one or both of users 152 and 154. Thus, in some implementations, action 682 may include having a group conversation with some, but not all, of the users included in group 150.

Action 682 may be performed by software code 110/310, executed by hardware processor 104 of multi-party conversational agent 100, and using conversation queue 574 and conversation manager 578 of dialogue manager 314/514, as well as output module 108/208. For example, text data output by dialogue manager 314/514 may be translated to speech using TTS module 237 and speaker(s) 238. Moreover, in some implementations, the group conversation may include facial expressions and/or movements, such as gestures by multi-party conversational agent 100, for example, produced using mechanical actuator(s) 239.

In some implementations, the first predetermined expression used in action 682 may be associated with a response criterion that must be met before multi-party conversational agent 100 will continue the group conversation. By way of example, a response criterion for the first predetermined expression may be "respond by all," meaning that the group conversation is continued only after all users included in group 150 respond to the first predetermined expression. Alternatively, a response criterion for the first predetermined expression may be "respond by any," meaning that the group conversation is continued when any user included in group 150 responds to the first predetermined expression. As yet another alternative, a response criterion for the first predetermined expression may be "no response necessary" when the first predetermined expression is merely declarative, or when it is a rhetorical question, for example. Thus, in some implementations, hardware processor 104 may execute software code 110/310 to identify a response criterion for the first predetermined expression, and to continue the group conversation when the response criterion is satisfied.

Flowchart 680 continues with identifying, while having the group conversation, a second predetermined expression for having a dialogue with at least one member of group 150 (action 683). The second predetermined expression may be identified in action 683 by software code 110/310, executed by hardware processor 104 of multi-party conversational agent 100, based on the data received from input module 130/230 and using interruption stack 576 and conversation manager 578 of dialogue manager 314/514, as well as one or more of conversation agent database 316 and user history communication module 318.

In some implementations, action 683 may occur in response to multi-party conversational agent 100 sensing a change in the composition of group 150 while having the group conversation. In those implementations, the second predetermined expression may be identified in action 683 based on the sensed change. The sensed change in the composition of group 150 may be a departure of a member of group 150 or an addition of a new member to group 150. For example, referring to FIG. 1, where group 150 may initially have included user 158, in addition to users 152, 154, and 156, action 683 may be in response to sensing the departure of user 158 from group 150 during the group conversation. Conversely, where group 150 initially includes users 152, 154, and 156, but not user 158, action 683 may be in response to sensing the addition of user 158 to group 150 during the group conversation. A change to the composition of group 150 may be sensed by software code 110/310, executed by hardware processor 104 of multi-party conversational agent 100, based on data received from input module 130/230 and using dialogue manager 3141514.

For example, in use cases in which the second predetermined expression is identified in action 683 based on a sensed change in the composition of group 150, and the sensed change is a departure of a member of group 150 or an addition of a new member to group 150, as described above, the second predetermined expression identified in action 683 may acknowledge the departure or the addition. In a use case in which user 158 joins group 150 during the group conversation, for instance, dialogue manager 314/514 may utilize user history communication module 318 to communicate with user history database 120 to determine if user 158 is remembered by multi-party conversational agent 100, so as to identify a greeting appropriate to the interaction history of user 158 with multi-party conversational agent 100.

That is to say, in some implementations, the second predetermined expression may be identified in action 683 based on a user history of at least one member of group 150.

As noted above, such an approach advantageously results in interactions that engage with users in a personalized manner over multiple sessions. If there is no memory data available for new user 158, the second predetermined expression may be a generic greeting or a request that user 158 identify himself or herself.

Flowchart 680 continues with interrupting the group conversation to have a dialogue, using the second predetermined expression, with at least one member of group 150 (action 684). In use cases in which a change in the composition of group 150 motivates the dialogue, and change is the departure of a group member during the group conversation, action 684 may correspond to multi-party conversational agent 100 interrupting the group conversation to remark on the departure of the group member to one or more remaining members of group 150. Conversely, in such use cases in which the change in the composition of group 150 is the addition of a new group member during the group conversation, action 684 may correspond to multi-party conversational agent 100 interrupting the group conversation to have a dyadic dialogue with the new group member only, greeting the new group member or welcoming the new group member to group 150.

Action 684 may be performed by software code 110/310, executed by hardware processor 104 of multi-party conversational agent 100, and using dialogue manager 314/514 and output module 108/208. For example, text data output by dialogue manager 314/514 may be translated to speech using TTS module 237 and speaker(s) 238. Moreover, in some implementations, the dialogue may include facial expressions and/or movements, such as gestures by multi-party conversational agent 100, for example, produced using mechanical actuator(s) 239.

In some implementations, the method outlined by flowchart 680 may conclude with action 684. However, as shown in FIG. 6, in some implementations, flowchart 680 may continue with resuming the group conversation after having the dialogue in action 684 (action 685). In one such implementation, for example, multi-party conversational agent 100 may resume the group conversation with group 150 and provide a status summary of the group conversation prior to the dialogue in action 684. For example, multi-party conversational agent 100 may resume the group conversation by rephrasing or summarizing what was being said before the interruption to the group conversation.

Action 685 may be performed by software code 110/310, executed by hardware processor 104 of multi-party conversational agent 100, and using conversation queue 574 and conversation manager 578 of dialogue manager 314/514, as well as output module 108/208. For example, and as noted above, text data output by dialogue manager 314/514 may be translated to speech using TTS module 237 and speaker(s) 238. Moreover, in some implementations, the resumed group conversation may include facial expressions and/or movements, such as gestures by multi-party conversational agent 100, for example, produced using mechanical actuator(s) 239.

In some implementations, flowchart 680 can continue and conclude with updating or creating a user history for members of group 150 based on one or both of the group conversation of actions 682, 683 and 685 and the dialogue of action 684 (action 686). As noted above, the creation and updating of user histories, such as user histories 122, 124, 126, and 128 stored in user history database 120, advantageously results in multi-party conversational agent 100 engaging with users in a personalized manner over multiple dialogues and/or group conversations. Action 686 may be performed by software code 110/310, executed by hardware processor 104 of multi-party conversational agent 100, and using dialogue manager 314/514 and user history communication module 318.

As noted above, in some implementations, flowchart 680 can conclude with action 64, while in other implementations, flowchart 680 may include one or both of additional actions 685 and 686. Moreover, it is further noted that actions 685 and 686, when performed, may occur in any order. It is also noted that subsequent to authoring of dialogue graphs 462 and conversational flows 470 through use of authoring interface 312/412, actions 681 through 684, or actions 681 through 684 followed by one or both of actions 685 and 686, may be performed in an automated process from which human involvement, other than the participation of group 150, may be omitted.

Thus, the present application discloses automated multi-party conversational agents and methods for their use that address and overcome the deficiencies in the conventional art. In contrast to conventional multi-party solutions, the multi-party conversational agents disclosed by the present application do not model group conversations merely as multiple concurrent dyadic dialogues. Instead, the present solution provides a framework for keeping track of a conversation as it evolves among a group, managing both verbal and non-verbal interruptions, and capable of engaging all group members in a fluent and consistent manner. When compared with the present state-of-the-art, the present solution provides a faster and more tractable way for authors attempting to manually craft and consider all possible conversational pathways for various multi-party interaction scenarios. The automatic handling of interruptions, user histories, and group versus dyadic topics are particularly effective in creating natural interaction experiences that would previously have been impossible or excessively costly to produce.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A multi-party conversational agent comprising:
a computing platform having a hardware processor and a memory;
a software code stored in the memory;
the hardware processor configured to execute the software code to:
identify a first predetermined expression for conversing with a group of people;
have a group conversation, using the first predetermined expression, with at least some members of the group;
identify, while having the group conversation, a second predetermined expression for having a dialog with at least one member of the group; and interrupt the group conversation to have the dialogue, using the second predetermined expression, with the at least one member of the group.

2. The multi-party conversational agent of claim 1, wherein the hardware processor is configured to further execute the software code to resume the group conversation after having the dialogue with the at least one member of the group.

3. The multi-party conversational agent of claim 2, wherein the hardware processor is configured to further execute the software code to resume the group conversation and provide a status summary of the group conversation prior to the dialogue.

4. The multi-party conversational agent of claim 1, wherein the hardware processor is configured to further execute the software code to:
sense a change in a composition of the group while having the group conversation;
identify the second predetermined expression based on the sensed change in the composition of the group.

5. The multi-party conversational agent of claim 4, wherein the sensed change in the composition of the group is a departure of a member of the group or an addition of a new member to the group, and wherein the second predetermined expression acknowledges the departure or the addition.

6. The multi-party conversational agent of claim 1, wherein the hardware processor is configured to further execute the software code to identify a response criterion for the first predetermined expression, and to continue the group conversation when the response criterion is satisfied.

7. The multi-party conversational agent of claim 6, wherein the response criterion is one of respond by all, respond by any, or no response necessary.

8. The multi-party conversational agent of claim 1, wherein the hardware processor is configured to further execute the software code to update or create a user history for each of the at least some members of the group based on the group conversation.

9. The multi-party conversational agent of claim 1, wherein the hardware processor is configured to further execute the software code to update or create a user history for each of the at least one member of the group based on the dialogue with the at least one member.

10. The multi-party conversational agent of claim 1, wherein at least one of the first predetermined expression or the second predetermined expression is identified based on a user history of at least one member of the group.

11. A method for use by a multi-party conversational agent including a computing platform having a hardware processor and a memory storing a software code, the method comprising:
identifying, by the software code executed by the hardware processor, a first predetermined expression for conversing with a group of people;
having, by the software code executed by the hardware processor and using the first predetermined expression, a group conversation with at least some members of the group;
identifying, while having the group conversation, by the software code executed by the hardware processor, a second predetermined expression for having a dialogue with at least one member of the group; and
interrupting, by the software code executed by the hardware processor, the group conversation to have the dialogue, using the second predetermined expression, with the at least one member of the group.

12. The method of claim 11, further comprising:
resuming, by the software code executed by the hardware processor, the group conversation after having the dialogue with the at least one member of the group.

13. The method of claim 12, wherein resuming the group conversation comprises providing a status summary of the group conversation prior to the dialogue.

14. The method of claim 11, further comprising:
sensing, by the software code executed by the hardware processor, a change in a composition of the group while having the group conversation;
identifying, by the software code executed by the hardware processor, the second predetermined expression based on the change in the composition of the group.

15. The method of claim 14, wherein the sensed change in the composition of the group is a departure of a member of the group or an addition of a new member to the group, and wherein the second predetermined expression acknowledges the departure or the addition.

16. The method of claim 11, further comprising:
identifying, by the software code executed by the hardware processor, a response criterion for the first predetermined expression; and
continuing, by the software code executed by the hardware processor, the group conversation when the response criterion is satisfied.

17. The method of claim 16, wherein the response criterion is one of respond by all, respond by any, or no response necessary.

18. The method of claim 11, further comprising:
updating or creating a user history, by the software code executed by the hardware processor, for each of the at least some members of the group based on the group conversation.

19. The method of claim 11, further comprising:
updating or creating a user history, by the software code executed by the hardware processor, for each of the at least one member of the group based on the dialogue with the at least one member.

20. The method of claim 11, wherein at least one of the first predetermined expression or the second predetermined expression is identified based on a user history of at least one member of the group.

* * * * *